United States Patent [19]

Berneburg

[11] Patent Number: 5,053,370
[45] Date of Patent: Oct. 1, 1991

[54] ALUMINUM OXIDE CERAMICS HAVING IMPROVED MECHANICAL PROPERTIES

[75] Inventor: Philip L. Berneburg, Potomac, Md.

[73] Assignee: W. R. Grace & Co.-Conn., New York, N.Y.

[21] Appl. No.: 386,549

[22] Filed: Jul. 27, 1989

[51] Int. Cl.$^5$ .................. C04B 35/10; C04B 35/18; C04B 35/44
[52] U.S. Cl. ........................................ 501/153; 501/6; 501/5
[58] Field of Search .............. 501/5, 119, 129, 9, 501/127, 1, 39, 74, 95; 264/56

[56] References Cited

U.S. PATENT DOCUMENTS 3,615,763 10/1971 Flock .................................. 106/46
4,895,814 1/1990 Kanzaki .............................. 501/128

FOREIGN PATENT DOCUMENTS 0317980 5/1989 European Pat. Off. .
2459176 10/1975 Fed. Rep. of Germany ...... 501/128
63-225574 9/1988 Japan .

Primary Examiner—William R. Dixon, Jr.
Assistant Examiner—Alan Wright
Attorney, Agent, or Firm—Steven Capella

[57] ABSTRACT

A wear-resistant alumina material is disclosed, as is its preparation by liquid phase sintering a mixture of about 70 to 95 percent by weight of crystalline $Al_2O_3$ particles and about 30 to 5 percent by weight of glass phase-forming components in a nitrogenizing atmosphere from which oxygen is substantially excluded. Generally, the resulting material has a 5 Kg Vickers hardness which is at least about 5 percent greater than the hardness of a corresponding alumina material sintered in air.

23 Claims, No Drawings

ALUMINUM OXIDE CERAMICS HAVING IMPROVED MECHANICAL PROPERTIES

FIELD OF THE INVENTION

This invention relates to alumina-based ceramic materials and more particularly to wear resistant alumina-based ceramic materials.

BACKGROUND OF THE INVENTION

The incorporation of nitrides into glass is known. For example, R. E. Loehman, "Oxynitride Glasses", MRS Bulletin (1987) discloses that silicon oxynitride glass may be made by in essence dissolving $Si_3N_4$, AlN, or some other nitride in a silicate melt. For instance, bulk silicon oxynitride glasses are commonly prepared by heating mixtures of $Si_3N_4$, AlN, $SiO_2$ and various other oxides in atmospheres (i.e. argon, nitrogen etc.) where the oxygen pressure is low at temperatures from about 1400° C. to 1750° C. The typical oxide additives include $Al_2O_3$, BaO, CaO, $La_2O_3$, $Li_2O$, MgO, $Sc_2O_3$ and $Y_2O_3$.

Nitrogen incorporation reportedly increases the glass density, hardness, glass transition temperature and fracture toughness while leading to lower glass solubility in aqueous solutions and, to a certain extent, decreasing the thermal expansion coefficient. Development of bulk oxynitride glasses is associated with research on $Si_3N_4$ and other nitrogen containing ceramics, and one of the disclosed uses for oxynitride glasses is for joining pieces of structural ceramics such as $Si_3N_4$. In particular, silicon nitride can be joined using oxynitride glasses that are similar to the glassy grain boundary phases normally present in that ceramic.

Various alumina materials comprising at least about 80% by weight $Al_2O_3$ are considered particularly valuable for use in the fields of high-temperature ceramics, wear-resistant articles and electrical insulators. The mechanical properties of such materials, including their strength, their volume stability at high temperatures, and their resistance to corrosion and thermal spalling as well as to abrasion and erosion make certain of these materials particularly attractive as refractories and ceramics in the petrochemical, nonferrous metal, and steel industries. In general, the hardness of such alumina materials is, like certain other properties, a function of the $Al_2O_3$ content. However, the cost of alumina materials also increases with $Al_2O_3$ content, and the fabrication of many products is more difficult from materials consisting essentially of $Al_2O_3$ crystals than from $Al_2O_3$ materials containing a glassy phase as well. For example, time and temperature conditions under which ceramic articles containing about 94 percent alumina particles and a glass phase comprising $Al_2O_3$, CaO, MgO, and $SiO_2$ can be sintered, can be less extreme than those under which it is possible to sinter articles containing essentially no glass phase. V. K. Singh "Densification of Alumina and Silica in the Presence of a Liquid Phase", Communication of the American Ceramic Society (1981) describes a study aimed at producing high-alumina and high-silica ceramics at low temperature and discusses sintering alumina and silica powders in the presence of phases derived from CaO, $Al_2O_3$, and $SiO_2$. Means for improving the mechanical properties of alumina materials containing glassy phase are of particular value.

S. Boskovic et al. "Liquid Phase Sintering of Inactive Alumina in the Presence of Non-Oxide Additives", High Tech Ceramics (1987) discusses the densification of inactive alumina powder in the presence of nitrogen-containing materials (e.g. up to about 25% of materials comprising 12.8% $Al_2O_3$, 9.2% $Si_3N_4$, 6% AlN and 72% either dysprosium alumina garnet or yttrium alumina garnet) in comparison to densification in the presence of oxide additives (e.g. materials comprising $Y_2O_3$, $Al_2O_3$ and $SiO_2$) and indicates that high density ceramics with good mechanical properties were obtained. Reportedly, the presence of additives which form nitrogen-containing liquids has a beneficial influence on densification of alumina powder, and two-phase composition ceramics can be obtained due to crystallization of garnet from the melt during cooling. Thus in the presence of nitrogen-containing liquids as sintering aids, ceramics having high density, hardness and good mechanical properties can be obtained at relatively low sintering temperatures (about 1550° C.) starting with inactive alumina powder.

SUMMARY OF THE INVENTION

We have found that polycrystalline alumina material having advantageous wear resistance properties and containing from about 70 to 95 percent by weight crystalline $Al_2O_3$ particles, and about 5 to 30 percent by weight of a glassy phase comprising a silicate glass can be produced by sintering said crystalline $Al_2O_3$ particles and glass phase-forming components in a nitrogenizing atmosphere. Gaseous oxygen is thus substantially excluded during sintering. The resulting alumina material is enriched with regard to the amount of nitrogen incorporated within its chemical structure and is harder than comparable alumina materials which are fired in oxygen-rich environments such as air.

It is an object of this invention to increase the hardness of alumina materials having glass phases comprising a silicate glass.

It is another object of this invention to provide a strong alumina material with advantageous wear resistance properties.

It is a further object of this invention to provide an alumina material containing at least about 70% crystalline $Al_2O_3$ particles and a glassy phase comprising a silicate glass in which nitrogen is incorporated.

These and other objects and advantages of the present invention will become apparent from the following detailed description of the invention.

DETAILED DESCRIPTION

The instant invention is directed to wear-resistant alumina materials which contain about 70 to 95 percent by weight crystalline $Al_2O_3$ particles and about 30 to 5 percent by weight of a glassy phase derived from components comprising silicon dioxide and which is enriched with regard to the amount of nitrogen incorporated within its chemical structure. These materials may be prepared by sintering a mixture of about 70 to 95 percent by weight of crystalline $Al_2O_3$ particles and about 30 to 5 percent by weight of glass phase-forming components comprising $SiO_2$ in a nitrogenizing atmosphere from which gaseous oxygen is substantially excluded. Nitrogenizing atmosphere as used herein means an atmosphere consisting essentially of nitrogen or of nitrogen and other gases which do not impede the uptake of nitrogen by the alumina material. These other gases may include oxygen scavenging gases such as hydrogen. The glass phase-forming components may comprise particles of components that form a glass during sintering. Alternatively, the glass phase-forming components may comprise particles of a silicate glass. The preferred alumina materials of this invention are prepared by subjecting a mixture containing about 70 to 95 weight percent $Al_2O_3$ crystal particles and particles of glass forming components including aluminum silicate (e.g. $Al_2O_3$—$SiO_2$ clays) to liquid phase sintering in an atmosphere consisting essentially of nitrogen or of nitrogen and an oxygen scavenging gas such as hydrogen. Preferably the mixture is comprised of $Al_2O_3$ crystal particles and particles of glass phase-forming components such that it contains interparticulate pores which allow nitrogen to permeate through the mixture during sintering. In any case the resulting materials, when compared to the same materials sintered in air, are enriched with regard to the quantity of nitrogen incorporated within their chemical structure.

It is possible to compact and shape the particles of glass or glass-forming components together with the $Al_2O_3$ crystals prior to sintering. However, it is ordinarily desirable that at least a portion of the interparticulate pores of the mixture be maintained prior to sintering in a nitrogenizing atmosphere so that the nitrogen can permeate the mixture during sintering. In other words, if the crystalline $Al_2O_3$ particles and the glass components were pre-sintered together in air to provide a thick dense article, further sintering in a nitrogenizing atmosphere may harden the outer surface of the article, but may not effectively incorporate nitrogen into interior of such an article. The increase in hardness achieved by this invention is generally accompanied by an increase in the specific gravity of the alumina material.

The glass phase-forming materials used for the present invention can be any of a number of conventional materials such as aluminum silicate-based clays, kyanite, glass frit or mixtures thereof with other various mineral oxides, carbonates and silicates. The glass phase-forming compounds may thus contain minor or trace amounts of MgO, $Na_2O$, $K_2O$, $B_2O_3$, BaO, $TiO_2$, $ZrO_2$, FeO, $Cr_2O_3$, $P_2O_5$ and/or other components (expressed as oxides) which are typically found in such conventional materials.

The final sintered alumina ceramics may for example consist of about 79% of $Al_2O_3$ as polycrystalline $Al_2O_3$ grains with a glassy grain boundary phase of a aluminum silicate glass which contains Ca, Mg and typically minor amounts of other elements selected from Na, K, B, Ba, Ti, Zr, Fe, Cr and P, as well as nitrogen introduced into the glass phase during and as a result of sintering in a nitrogen atmosphere. Alumina ceramics of the aforesaid description, fired in air and not containing significant nitrogen, are well known and are available commercially. W. R. Grace & Co., Diamonite Products, for example, produces an air-sintered alumina ceramic containing about 85 weight percent $Al_2O_3$ with a predominantly Ca, Al silicate glass phase. The raw materials for this ceramic were processed by the preferred technique described herein, resulting in improved properties, as described in the examples.

The liquid phase sintering process used in this invention may be accomplished in a furnace or kiln which is suitably electrically heated, and of the controlled atmosphere type where a specific atmosphere can be maintained (under slight positive pressure if necessary) with exclusion of air. Such furnaces are well-known and are commercially available. The effective furnace atmosphere, as noted, is nitrogen with exclusion of oxygen. Suitably, the atmosphere can contain a little hydrogen (e.g., about 5 volume %) to scavenge traces of oxygen associated with the alumina or the furnace internals. Such gas mixtures may be introduced as such or may be prepared by mixing the components within the furnace. A type of preferred furnace is the so-called "vacuum furnace". In this type of batch furnace, the charge can be placed inside the furnace, which is then sealed and evacuated, thereby reducing the amount of oxygen within the furnace chamber and also oxygen adherent to the charge, especially within the particle interstices. Nitrogen may then be admitted and pressure equilibrium attained. The evacuation and refilling (flushing) operation may be repeated several times, thereby substantially lowering the potential for internal oxygen contamination. Oxygen-free setter powders such as SiC powders may also be employed to support the alumina material during sintering. The charge is then ready for sintering in nitrogen, under the invention conditions. The invention employs liquid phase sintering which produces a melted or softened glass phase that interacts with the nitrogen gas in the furnace and flows between the crystalline $Al_2O_3$ particles, thereby increasing the material density.

The nitrogen-containing alumina materials of this invention are hardened and thus have advantageous wear-resistance properties. Preferably the hardness of these nitrogen-enriched aluminas, as measured by the 5 Kg Vickers hardness test standard, (i.e. the $Hv_5$) is at least about 5% greater than the hardness of a corresponding alumina material which has been sintered in air rather than a nitrogenizing atmosphere. Accordingly, sintering in a nitrogenizing atmosphere is ordinarily conducted for sufficient time to achieve at least this amount of hardness change. Most preferably sintering in a nitrogenizing atmosphere is for sufficient time to achieve a one percent increase in $Hv_5$ hardness (when compared to corresponding air-sintered materials) for each percent by weight of glass phase in the sintered alumina material.

The hardened aluminas of this invention have sundry industrial uses. They are particularly valuable in parts subjected to continuing wear, such as dies for extrusion of plastics; wire-drawing dies; fiber guides; and the like. Because of their strength and improved hardness they are also considered to be useful in fabricating ballistic armor (e.g., as plates for insertion in pockets in protective vests); and for personnel protection in vehicles and aircraft.

Practice of the invention will become further apparent from the following non-limiting examples.

EXAMPLE I

Two pellets were cold-pressed from Diamonite spray-dried nominal 85% $Al_2O_3$ powder composition (containing $Al_2O_3$ particles and glass forming components including $SiO_2$) and were sintered for about 3 hours at 1550° C. in nitrogen containing approximately 5% hydrogen. 400 grit SiC powder was used as setter powder for the pellets. Subsequent Vickers indentation hardness testing for one pellet, at 5, at 2 and at 0.5 kg loads gave Vickers hardness values (Hv's in kg/mm$^2$) of $Hv_5=1284$, $Hv_2=1264$, and $Hv_{0.5}=1345$ respectively; and testing at 5 kg for the other pellet gave an $Hv_5=1334$. These values are considerably higher than those typical of air-sintered 85% alumina ($Hv_5=900$-1100). Densities of the two nitrogen-sintered pellets (3.64 and 3.66 g/cm$^3$, respectively) were also higher than the theoretical value for this composition fired in air (typically about 3.49 g/cm$^3$), indicating that nitrogen had been incorporated in the material. This is in agreement with the known increase in density of glasses that accompanies the incorporation of nitrogen (see, for example, the previously referenced article by R. E. Loehman). The measured increase in overall density of the alumina-based ceramic material is considered attributable to the increase in the density of the glassy component thereof as nitrogen is incorporated in the glassy component.

EXAMPLE II

The process of Example I was repeated except that Al$_2$O$_3$ setter powder was used for the parts. Microhardness measurements were made on the sintered pellets (polished X-sections) and on standard air-fired 85% alumina. Five indentations at a 5 Kg load for the nitrogen-sintered pellet gave an average Hv$_5$ of 1201 Kg/mm$^2$, while five indentations at a 5 Kg load for the air-sintered tile gave an average Hv$_5$ of 1002 Kg/mm$^2$, again indicating higher hardnesses for the nitrogen-sintered material.

The slightly lower hardness for the pellet treated in this example, compared to the pellets treated in the previous example is attributed to oxygen contamination in the furnace atmosphere from the use of the Al$_2$O$_3$ setter powder.

EXAMPLE III

A nitrogen-containing alumina tile sample (N$_2$-P-85) prepared from nominal 85% Al$_2$O$_3$ material by the described process and an air-fired sample (P-85) were wear tested by a four-hour SiC grit blast test. This was a test in which tile samples were mounted on a fixture and rotated at 375 rpm at a distance of 2–3″ from a grit blasting nozzle. Air pressure was 50 psi and impingement angle was 90°. The volume loss was measured in successive increments of 10, 50, 60, 60, and 60 minutes. The results are reported below in Table A as the normalized volume loss over a given period of time (V$_{time}$), with the P-85 standard tiles as the base (i.e. V$_{time}$ for each air-fired sample is 1.0). The volume loss was calculated from the measured weight loss divided by the apparent specific gravity (ASG).

TABLE A

| Material | ASG | Normalized Wear | | | | | Hardness |
| | | V$_{10}$ | V$_{60}$ | V$_{120}$ | V$_{180}$ | V$_{240}$ | Hv$_5$ |
|---|---|---|---|---|---|---|---|
| P-85 | 3.49 | 1.00 | 1.00 | 1.00 | 1.00 | 1.00 | 1084 |
| N$_2$-P-85 | 3.61 | 1.31 | 1.08 | 1.03 | 0.97 | 0.91 | 1340 |

Volume loss after 4 hours was 9% less than volume loss in the same test for an air-fired P-85 sample.

EXAMPLE IV

Five different alumina materials representing a range of glass contents were fired in nitrogen, and the 5 kg Vickers hardnesses were measured and compared to the values obtained from standard air-fired samples of the same materials. Test bars (pressed at 18 ksi) of each of the materials listed below were air fired in the "normal" kiln, and bars were also fired in a nitrogen furnace to approximately the same temperature for each material. The Vickers hardness at a 5 kilogram load was then measured on one half-bar of each material. The results are given below.

TABLE B

| Nominal* % Al$_2$O$_3$ | Material | Kiln Gas | Hv$_5$ | Kiln Gas | Hv$_5$ | Change in Hv$_5$ |
|---|---|---|---|---|---|---|
| 79 | P-85 Excess Glass | Air | 888 | N$_2$ | 1220 | +37.4% |
| 85 | P-85 | Air | 990 | N$_2$ | 1262 | +27.5% |
| 92 | B-890 | Air | 1017 | N$_2$ | 1092 | +7.4% |
| 96 | P-96 | Air | 1360 | N$_2$ | 1340 | −1.5% |

*Nominal Al$_2$O$_3$ includes both Al$_2$O$_3$ particles and aluminum content of glass phase.

The results show a strong relationship between the total glass phase present in the body and the percent increase in hardness, confirming that changes in the glass phase induced by the nitrogen firing are responsible for the improved hardness. Normally hardness values would decrease with increasing glass contents, as exemplified by the results for the air-sintered samples in Table B.

X-ray diffraction analysis was performed on these samples to determine whether additional crystalline phases formed during the nitrogen sintering might be responsible for the improved hardness, in contrast to solution of the nitrogen in the glass phase, as proposed. Although somewhat inconsistent due to variations in the firings, the x-ray diffraction analysis results support the idea that additional crystalline phases are not being formed and that the property improvements are due to modification of the properties of the grain boundary glass phase.

While I do not wish to be bound to any particular theory or mechanism, the improvement in hardness in alumina treated per my invention is considered to be caused by incorporating nitrogen atoms into the glass phase, with possible actual replacement of some of the oxygen atoms in the silicate network. Nitrogen, being trivalent, may well form a stronger glass network than divalent oxygen, making the hardness of the alumina material closer to the hardness of the crystalline Al$_2$O$_3$ particles therein (i.e. closer to the hardness of an air-sintered alumina of higher purity). In any case, regardless of the mechanism, nitrogen is incorporated into the chemical structure of the sintered alumina material, in quantities greater than that present in air-fired alumina, and the result is an increase in hardness and thus advantageous wear resistance in various applications.

The examples describe particular embodiments of the invention. Other embodiments will become apparent to those skilled in the art from a consideration of the specification of practice of the invention disclosed herein. It is understood that modifications and variations may be practiced without departing from the spirit and scope of the novel concepts of this invention. It is further understood that the invention is not confined to the particular formulations and examples herein illustrated, but it embraces such modified forms thereof as come within the scope of the following claims.

What is claimed is:

1. A wear-resistant polycrystalline alumina material prepared by the liquid phase sintering of a mixture of about 70 to 95 percent by weight of crystalline Al$_2$O$_3$ particles and about 30 to 5 percent by weight of silicate glass phase-forming components in a nitrogenizing atmosphere from which gaseous oxygen is substantially excluded; said alumina material being enriched with regard to the amount of nitrogen incorporated within its chemical structure and having a Hv$_5$ hardness which is at least about 5% greater than the hardness of a corresponding alumina material made from the same amount of crystalline $Al_2O_3$ particles and the same amount of silicate glass phase-forming components, but which has been sintered in air rather than in a nitrogenizing atmosphere.

2. The wear-resistant polycrystalline alumina material of claim 1 comprising about 85% $Al_2O_3$.

3. The wear-resistant polycrystalline alumina material of claim 2 having an apparent specific gravity of about 3.61 or more.

4. The wear-resistant polycrystalline alumina material of claim 2 having an $Hv_5$ of about 1262 $Kg/mm^2$, or more.

5. The wear-resistant polycrystalline alumina material of claim 2 comprising an alumina silicate glass which contains nitrogen, calcium, magnesium and other elements selected from Na, K, B, Ba, Ti, Zr, Fe, Cr and P.

6. The wear-resistant polycrystalline alumina sintered material of claim 1 having a $Hv_5$ which is greater by at least one percent for each percent by weight of glass phase in the sintering material than the $Hv_5$ of a corresponding alumina material made from the same amount of crystalline $Al_2O_3$ particles and the same amount of silicate phase-forming components, but which has been sintered in air rather than in a nitrogenizing atmosphere.

7. The wear-resistant polycrystalline alumina material of claim 6 comprising about 85% $Al_2O_3$.

8. A process for producing a wear-resistant alumina material comprising the step of liquid phase sintering a mixture of about 70 to 95 percent by weight of crystalline $Al_2O_3$ particles and about 30 to 5 percent by weight of silicate glass phase-forming components comprising $SiO_2$ in a nitrogenizing atmosphere from which gaseous oxygen is substantially excluded for a time sufficient to achieve a $Hv_5$ hardness which is at least about 5% greater than the hardness of a corresponding alumina material made from the same amount of crystalline $Al_2O_3$ particles and the same amount of silicate phase-forming components, but which has been sintered in air rather than in said nitrogenizing atmosphere.

9. The process of claim 8 wherein sintering is for sufficient time to achieve an increase in $Hv_5$ hardness of about one percent for each percent by weight of silicate glass phase in the sintered alumina material which has been sintered in air rather than in said nitrogenizing atmosphere.

10. The process of claim 8 wherein the nitrogenizing atmosphere consists essentially of nitrogen.

11. The process of claim 8 wherein the nitrogenizing atmosphere consisting essentially of nitrogen and hydrogen.

12. The process of claim 8 wherein the mixture is comprised of $Al_2O_3$ crystal particles and particles of silicate glass phase-forming components and contains interparticulate pores which permit nitrogen to permeate through the mixture during sintering.

13. The process of claim 12 wherein the silicate glass phase-forming components comprise particles of components which form a silicate glass during sintering.

14. The process of claim 12 wherein the silicate glass phase-forming components comprise particles of a silicate glass.

15. The process of claim 8 wherein the mixture is comprised of compacted particles of $Al_2O_3$ crystals and particles of silicate glass phase-forming components wherein at least a portion of the interparticulate pores of the mixture are maintained prior to sintering.

16. The process of claim 8 wherein the silicate glass phase-forming components include aluminum silicate.

17. The process of claim 16 wherein the silicate glass-forming components include $Al_2O_3$-$SiO_2$ clay.

18. The process of claim 8 wherein the $Al_2O_3$ content of the mixture is about 85 weight percent by weight.

19. The process of claim 18 wherein sintering is continued until the alumina material has an apparent specific gravity of about 3.61 or more.

20. The process of claim 8 wherein the mixture is supported by oxygen-free setter powder during sintering.

21. The process of claim 20 wherein the oxygen-free setter powder is SiC.

22. The process of claim 8 wherein sintering is for about 3 hours.

23. The process of claim 8 wherein sintering is at about 1550° C.

* * * * *